(12) United States Patent
Tan et al.

(10) Patent No.: US 7,495,708 B2
(45) Date of Patent: Feb. 24, 2009

(54) PREVENTING PICTURE JITTER IN A DIGITIZED VIDEO SIGNAL

(75) Inventors: Chee Lam Tan, Singapore (SG); Hua Li, ShenZhen (CN); Frank Dumont, Singapore (SG)

(73) Assignee: Thomson Licensing, Boulogne-Billancourt (FR)

( * ) Notice: Subject to any disclaimer, the term of this patent is extended or adjusted under 35 U.S.C. 154(b) by 590 days.

(21) Appl. No.: 11/180,252

(22) Filed: Jul. 13, 2005

(65) Prior Publication Data
US 2006/0013569 A1    Jan. 19, 2006

(30) Foreign Application Priority Data
Jul. 16, 2004   (EP)   ................... 04291827
Oct. 28, 2004   (EP)   ................... 04292558

(51) Int. Cl.
*H04N 1/12*   (2006.01)
*H04N 5/00*   (2006.01)
(52) U.S. Cl. ........................ 348/572; 348/616
(58) Field of Classification Search ................. 348/572, 348/573, 552–570, 597, 598, 500, 536–549, 348/616, 617
See application file for complete search history.

(56) References Cited

U.S. PATENT DOCUMENTS 4,287,529 A * 9/1981 Tatami et al. ................. 386/51
5,132,793 A * 7/1992 Hirahata et al. ............. 348/556
5,241,398 A   8/1993 Urata et al.

FOREIGN PATENT DOCUMENTS

EP        0 592 932 A      4/1994
EP        0 705 034 A      4/1996

* cited by examiner

*Primary Examiner*—M. Lee
(74) *Attorney, Agent, or Firm*—Robert D. Shedd; Joseph J. Opalach; Reitseng Lin

(57) ABSTRACT

The present invention proposes a method for generating a digital video signal from an analog input video signal, which prevents picture jitter in the digitized video signal when the analog input video signal is not in complete conformity with a standard. According to the invention, the method includes the steps of:

detecting the type of signal source;
in case the type of signal source is a non-standard type, detecting the existence of an error state;
converting the analog input video signal to a digital video signal;
in case an error state exists, replacing an error prone part of the digitized video signal with a substitute signal part; and
in case the type of signal source is a standard type or no error state exists, keeping the digitized video signal unchanged.

10 Claims, 3 Drawing Sheets

PREVENTING PICTURE JITTER IN A DIGITIZED VIDEO SIGNAL

This application claims the benefit, under 35 U.S.C. § 119 of European Patent Application 04291827.6, filed Jul. 16, 2004 and European Patent Application 0492558.6, filed Oct. 28, 2004.

FIELD OF THE INVENTION

The present invention relates to a method for generating a digital video signal from an analog input video signal, and to an apparatus having means for digitizing an analog input video signal using such method.

BACKGROUND OF THE INVENTION

Digital storage devices such as a HDD-recorder or a DVD-recorder usually have an analog video input and an analog video output. Internally, however, the video signal is digitized for processing such as MPEG compression etc. An incoming analog video signal is first digitized by means of an 8, 9 or even 10-bit ADC (Analog-to-Digital converter), hereafter referred to as video converter, before any digital processing or compression is performed. The digitized video signal normally conforms to the ITU R-656 standard. The processed video signal may be stored on a recording medium such as for example a DVD disc, a VCD disc, or a DVHS tape. It may also be viewed directly after MPEG decoding. For this purpose the digitized video signal is converted back into an analog video signal by means of a DAC (Digital-to-Analog converter).

In this context U.S. Pat. No. 6,300,985 describes how to convert a normal analog CVBS signal into a Serial Digital Interface output signal.

Analog-to-digital conversion is performed using ICs that work well if there is an analog input video signal that is in conformity with a standard (ITU-R BT624 for PAL, SMPTE 170M for NTSC, etc.). Sometimes, however, the analog input video signal is not in complete conformity with a standard, e.g. when it comes from a VCR in trick mode (like pause or fast forward). In these cases e.g. the fields (upper field, lower field) are mixed up. Though the ADC IC still generates a digital video signal, this signal contains errors.

In the case when the analog input video signal conforms strictly to a standard such as NTSC and PAL, the encoded and decoded video signal displayed on the TV is normal. This means the interlaced field sequence is correctly displayed and there is no jitter of the picture.

However, when the analog input video signal does not conform strictly to the video standards, then the digitized video signal becomes defective, giving rise to imperfections such as a jittering picture when the 1st field and the 2nd field are displayed in the wrong sequence.

SUMMARY OF THE INVENTION

It is an object of the invention to propose a method for generating a digital video signal from an analog input video signal, which prevents picture jitter in the digitized video signal when the analog input video signal is not in complete conformity with a standard.

According to the invention, this object is achieved by a method for generating a digital video signal from an analog input video signal including the steps of:
 detecting the type of signal source;
 in case the type of signal source is a non-standard type, detecting the existence of an error state;
 converting the analog input video signal to a digital video signal;
 in case an error state exists, replacing an error prone part of the digitized video signal with a substitute signal part; and
 in case the type of signal source is a standard type or no error state exists, keeping the digitized video signal unchanged.

Before digitizing the analog input video signal it is determined whether the signal comes from a non-standard type of source, e.g. a VCR. If the signal is received from a TV broadcaster or from a DVD then there are no errors to be expected. It is then checked for the existence of an error state, i.e. if the non-standard signal source is in a state where errors are likely to occur. For a VCR, for example, possible error states are the trick modes such as Pause or Fast Forward/Rewind. If such an error state exists, an error prone part of the digitized video signal is replaced with a substitute signal part. For a VCR in trick mode delivering a CVBS signal, for example, it has been found that especially the information about 1st/2nd field is disturbed in the digitized (ITU656) video signal due to non-standard timing signals in the analog input video signal. In order to correct the field information, a predefined placeholder is inserted in the digitized video signal. This predefined placeholder is defined such that it is correct in most, or even all, cases. Preferably, an internal signal of the video converter having a stable timing is used for replacing the field bit. For this purpose advantageously the whole field is shifted by a determined number of lines. For adapting the method to different non-standard types of signal sources the determined number of lines should be adjustable by the user or automatically. In case the type of signal source is a standard type or no error state exists, the digitized video signal is kept unchanged. For a "safe" analog input video signal, i.e. a presumably error free signal, there is no need to perform any replacement, as such replacement could generate unexpected errors. The above steps are preferably repeated constantly.

The invention has the advantage that even in case of a slightly distorted analog input video input signal as e.g. from a VCR in trick mode the resulting digital video signal has no errors. Of course, the invention is not limited to a VCR as signal source. It is likewise applicable to other types of sources using a tape as recording medium, e.g. camcorders, or any other device delivering a non-standard analog video signal.

Preferably, a method according to the invention is used in an apparatus for receiving and/or recording a digital video signal, having an input for receiving an analog video signal and means for digitizing a received analog video signal

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
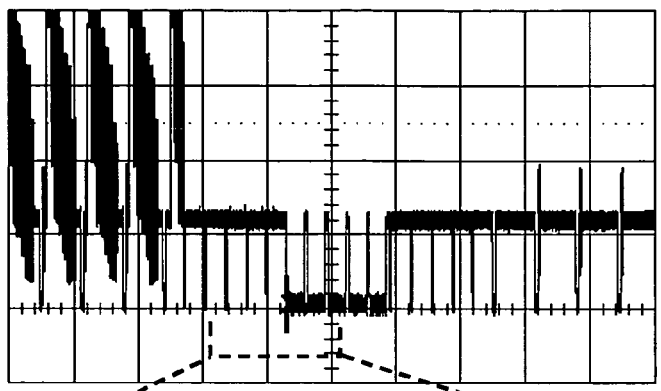
FIG. 1 shows a normal CVBS analog video signal.
Figure 1:
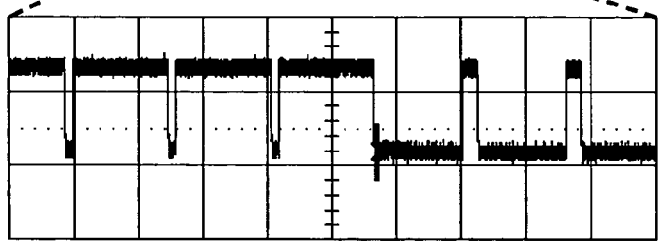

In FIG. 1a) a normal CVBS analog video signal at the instant of vertical timing (V timing) with correct pre-equalization pulses, serration pulses and post-equalization pulses is shown. An enlarged portion of this signal is depicted in FIG. 1b).

Figure 2:
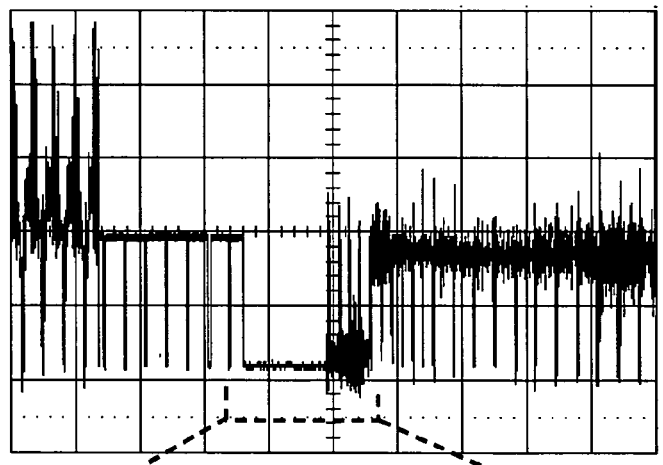
FIG. 2 shows a distorted analog video signal output by a VCR in trick mode.
Figure 2:
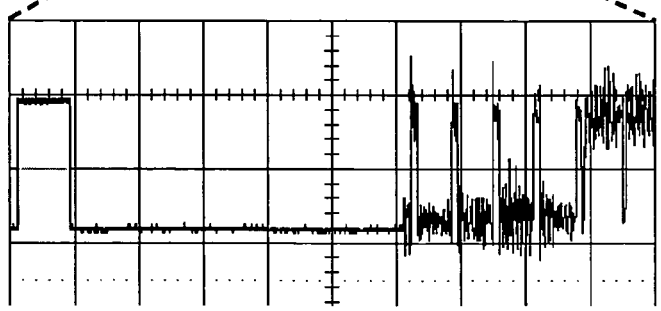

A distorted analog video signal is depicted in FIG. 2a). Again, FIG. 2b) shows an enlarged portion of this signal. In this example the signal comes from a VCR operated in trick mode, e.g. in Pause or Fast Forward/Rewind mode. Such a signal usually is defective and shows a plurality of distortions such as a non-standard line length or a non-standard vertical synchronization signal. This means that when the VCR is in trick mode, the V timing of the output CVBS signal becomes non-standard. In this case the video converter cannot generate the proper Field signals from the H (horizontal) and V timing and the resulting digital video signal becomes jittery. In the example in FIG. 2 there is a delay of about four lines between the pre-equalization pulses and the serration pulses. This additional delay disturbs the field signal generation.

Figure 3:
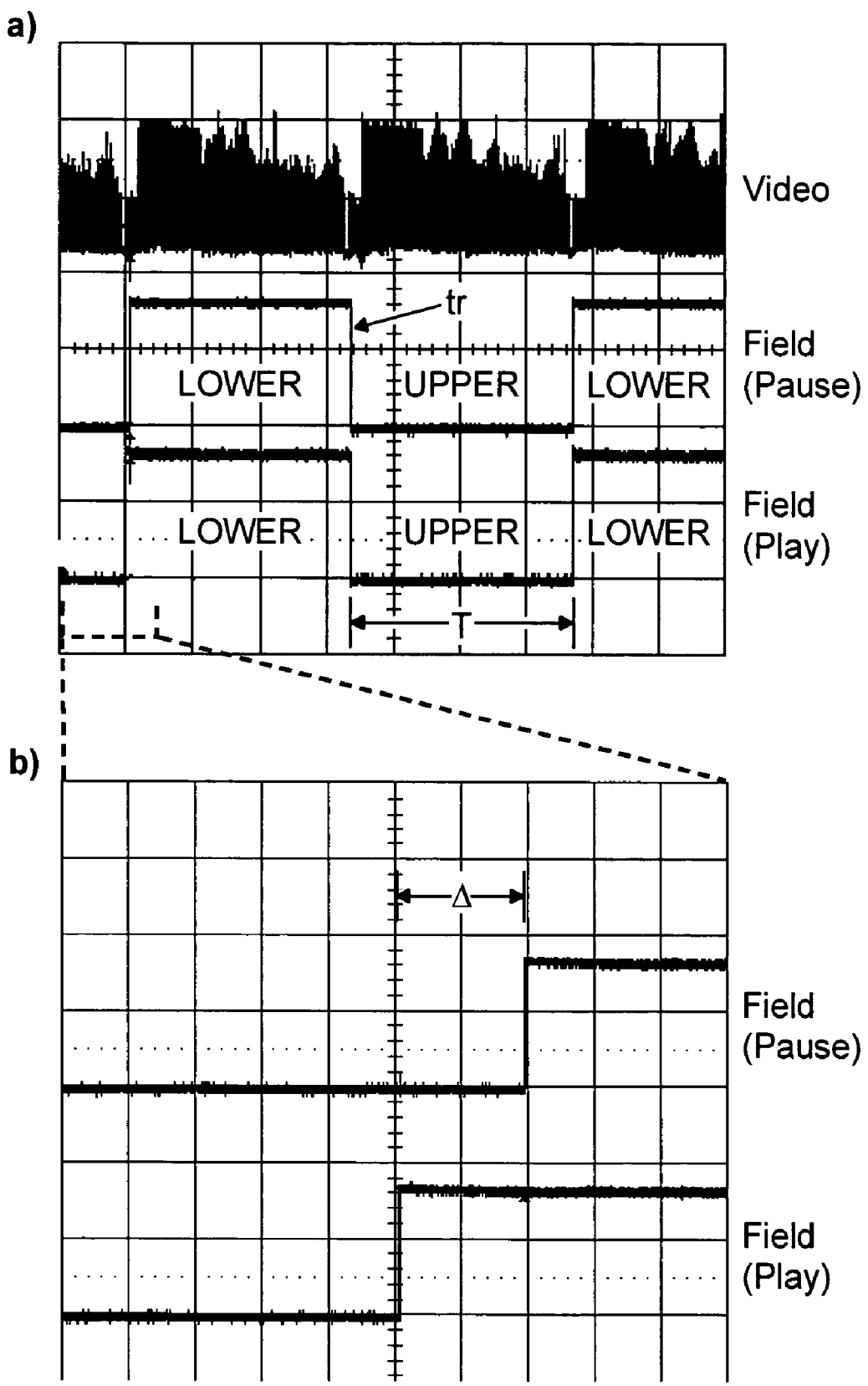
FIG. 3 shows a jittery digital video signal caused by a trick mode.
Figure 4:
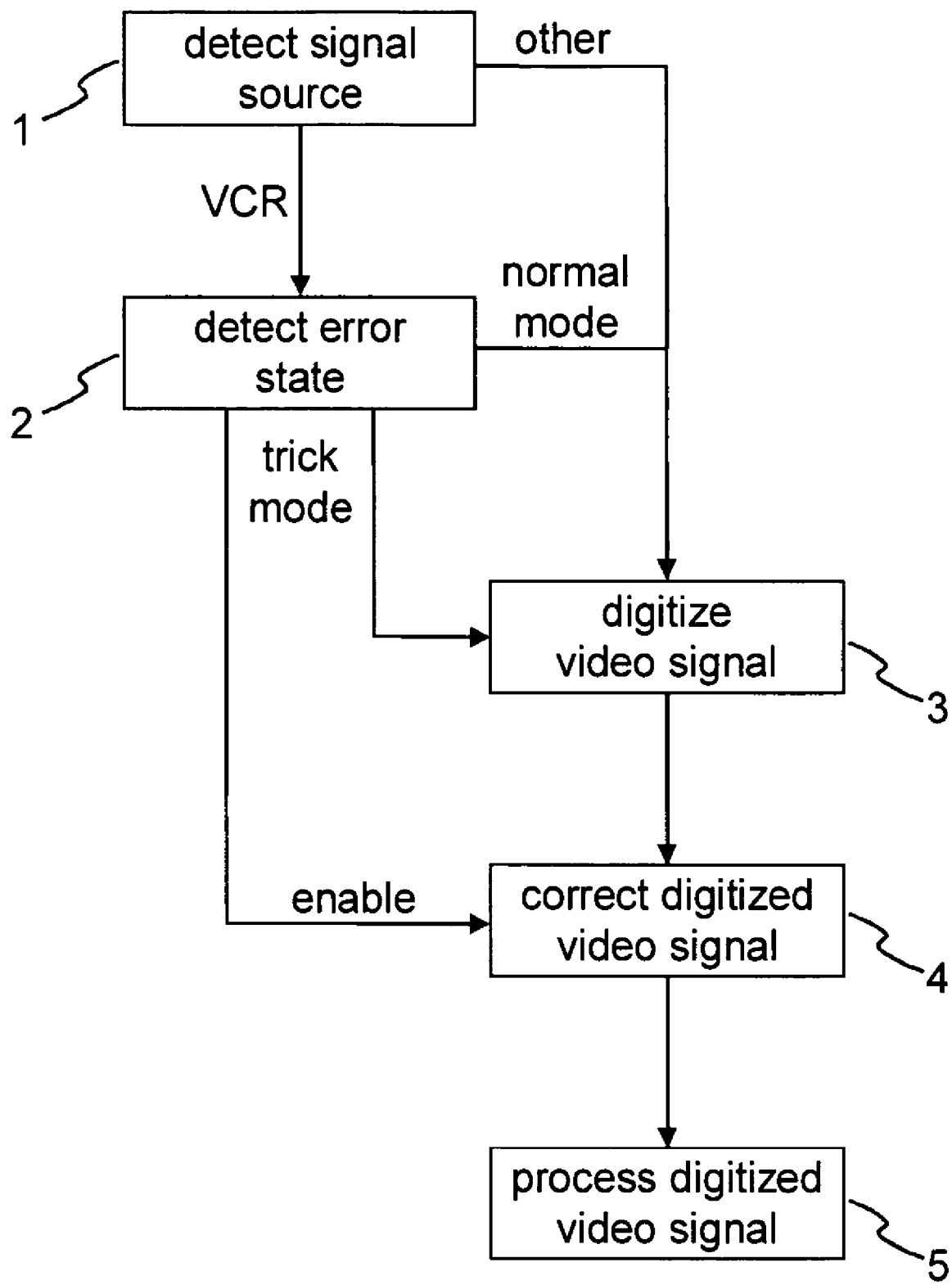
FIG. 4 depicts a flowchart of a method according to the invention.

Such a jittery digital video signal is depicted in FIG. 3a). As before FIG. 3b) shows an enlarged portion of this signal. Depicted are the Field signal (Lower or Upper, also referred to as Even or Odd) in trick mode (pause), and the field signal in normal mode. As can be seen the duration T of the low level period of the field signal is the same during trick mode as during normal mode. However, the duration of the high level period of the field signal changes by a delay Δ during trick mode. In this specific example the start position of the lower field is shifted by about 180 μs, which corresponds to a delay of three lines. Consequently, the lower field of the picture on the TV screen will be displayed three lines later than normal, too. In the figure, the falling edge of the field signal is used as a trigger tr.

In order to cope with the jittery video signal, in a first step 1 the type of the signal source is detected. To prevent any unnecessary or wrong action, changes to the video signal are only performed in an A/V input mode. To distinguish between a VCR and other types of sources, one possibility is to analyze the time-base of the video signal. As the VCR signal has a non-stable time-base, and signals coming from a TV broadcaster or a DVD player have a stable time-base, this feature can be used to detect the signal source. If the input signal has a non-stable time-base, it is deemed to be received from a VCR.

In case the analog input video signal is received from a VCR, in a second step 2 it is analyzed whether the VCR is in an error state, i.e. in a state such as trick mode that is likely to produce errors. In most VCRs the Vsync is inserted by the main signal processor in trick mode. Normally, the frequency of this inserted Vsync is non-standard. This means that if the frequency of Vsync is determined to be out of a specified range, then the VCR is in trick mode.

In the following step 3 the analog input video signal is digitized. If the analog input video signal is not received from a VCR, or if it is received from a VCR operating in normal mode, then after digitization 3 the digitized video signal is kept unchanged, as there is no need to perform any correction. In fact, an unnecessary correction might rather generate an undesired error. If, however, the input signal comes from a VCR operating in trick mode, then after digitization 3 in a further step 4 an error prone part of the digitized signal is replaced with a substitute signal part.

According to the ITU656 specification, bit6 of the SAV/EAV header indicates the field:

| BIT 7 | BIT 6 (F) | BIT 5 (V) | BIT 4 (H) | BIT 3 (P3) | BIT 2 (P2) | BIT 1 (P1) | BIT 0 (P0) |
|---|---|---|---|---|---|---|---|
| 1 | field bit<br>1st field: F = 0;<br>2nd field: F = 1 | vertical blanking bit<br>VBI: V = 1;<br>active video: V = 0; | format<br>H = 0 in SAV;<br>H = 1 in EAV | reserved; evaluation not recommended (protection bits according to ITU 656) | | | |

Many video converters provide an internal signal (e.g. Vgate) that has a stable timing. This signal is used for replacing the field bit in the SAV/EAV header. This replacement is done by changing the register settings of the video converter.

In a final step 5 the digitized video signal is submitted to further processing like MPEG coding etc. The above steps are preferably constantly repeated.

To replace the field bit advantageously means to shift the whole field by a certain number of lines, e.g. by three lines. The value of the internal signal (Vgate) usually is programmable. It can, therefore, be programmed to be stable. For example, the signal may be delayed by one line. The starting point for the signal is the transition from upper to lower. For the above example of a delay of about 180 μs a shift backwards by three lines is performed.

Preferably, a device using this method for preventing picture jitter is user adjustable. Then the user may adjust the delay to different numbers of lines, for example three, four or five lines, until the jitter disappears. Even if only a single source of the analog input video signal is used different delay values are advantageous, e.g. when the source uses a tape that was recorded on another device. In such a case larger delay values may be needed to reduce jitter.

What is claimed is:

1. Method for generating a digital video signal from an analog input video signal comprising:
   detecting the type of signal source;
   in case the type of signal source is a non-standard type, detecting the existence of an operating state where errors are likely to occur;
   converting the analog input video signal to a digital video signal;
   in case an operating state where errors are likely to occur exists, replacing an error prone part of the digitized video signal with a substitute signal part; and
   in case the type of signal source is a standard type or no operating state where errors are likely to occur exists, keeping the digitized video signal unchanged.

2. Method according to claim 1, wherein the non-standard type of signal source is an apparatus for playback or recording of a tape.

3. Method according to claim 1, wherein the operating state where errors are likely to occur is a trick mode of the signal source.

4. Method according to claim 1, wherein the analog input video signal is a CVBS signal.

5. Method according to claim 1, wherein the digitized video signal is an ITU656 signal.

6. Method according to claim 5, wherein the error prone part of the digitized video signal is the field bit of a header.

7. Method according to claim 6, wherein an internal signal of a video converter having a stable timing is used for replacing the field bit.

8. Method according to claim 7, wherein for replacing the field bit the whole field is shifted by a determined number of lines.

9. Method according to claim 8, wherein the determined number of lines is adjustable.

10. Apparatus for receiving and/or recording a digital video signal, having an input for receiving an analog video signal and means for digitizing a received analog video signal, wherein the apparatus performs the method according to claim 1 for generating a digital video signal from the received analog video signal.

* * * * *